Aug. 11, 1970     W. D. RYCKMAN, JR     3,524,088
DRIVE MECHANISM FOR SELECTIVE OUTPUT MOTIONS
Filed May 19, 1969     2 Sheets-Sheet 1
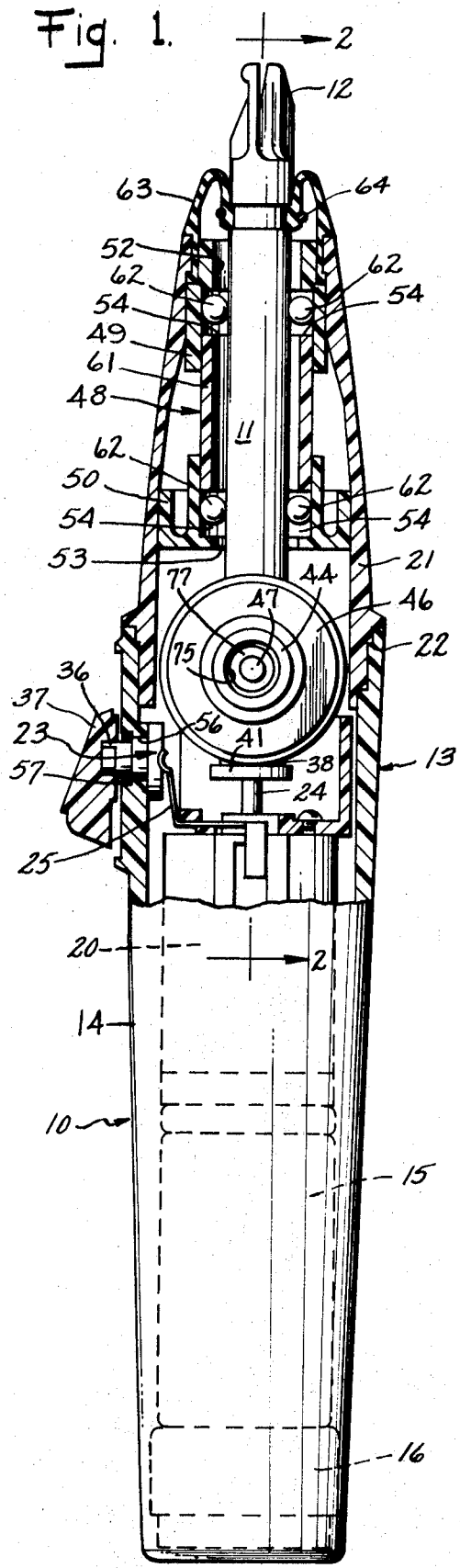
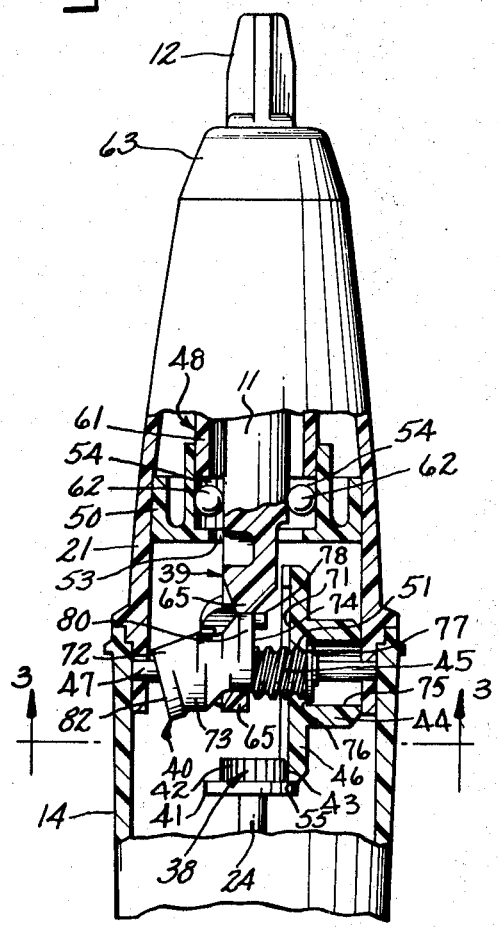
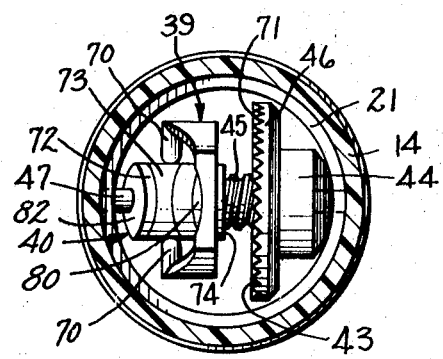
Inventor:
William D. Ryckman Jr.
by *Frederick A. Weidner Jr.*
Attorney Aug. 11, 1970     W. D. RYCKMAN, JR     3,524,088
DRIVE MECHANISM FOR SELECTIVE OUTPUT MOTIONS
Filed May 19, 1969     2 Sheets-Sheet 2
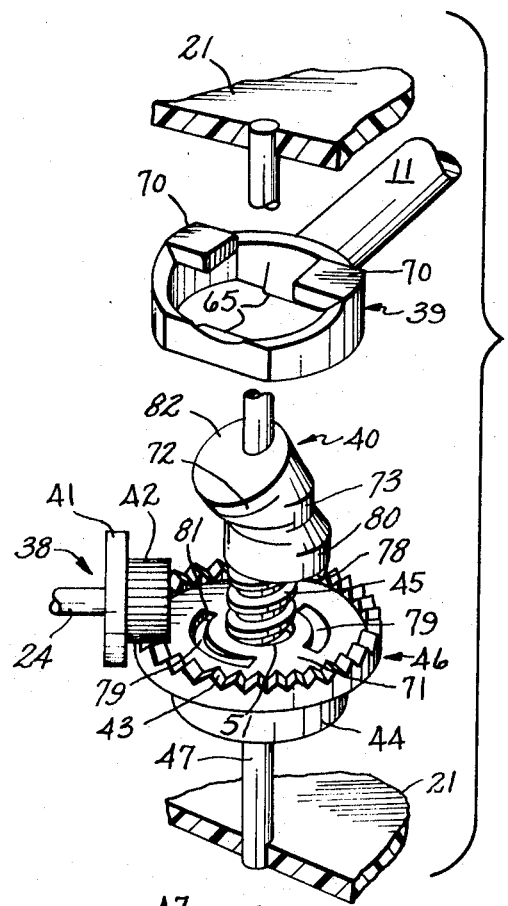
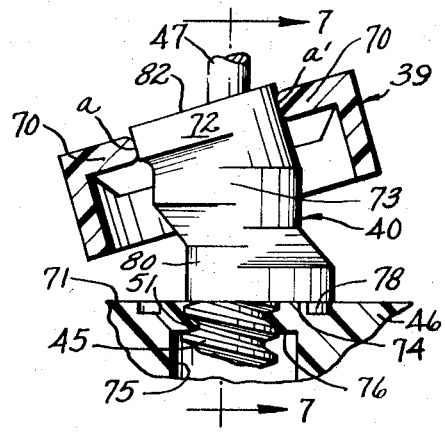
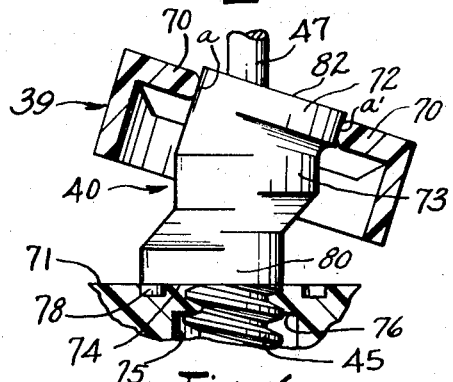
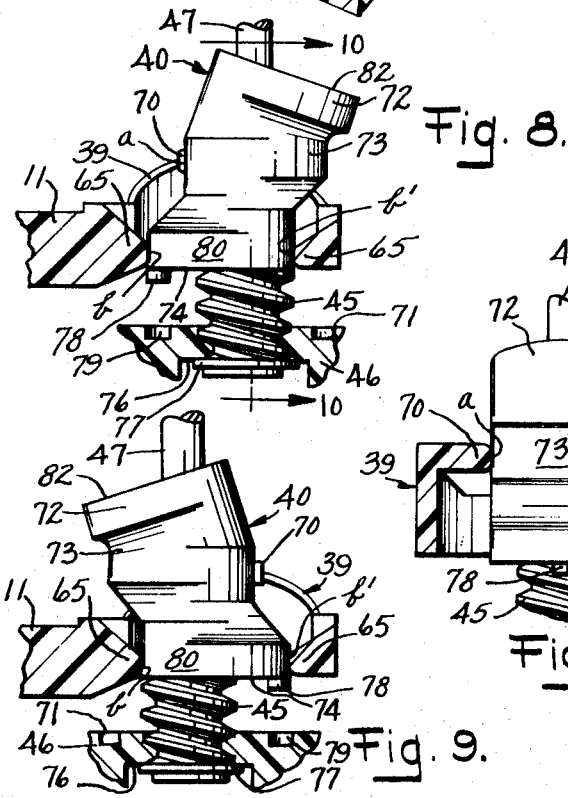
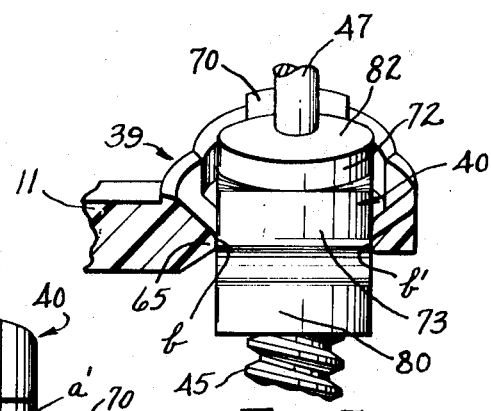
Inventor:
William D. Ryckman Jr.
by
Frederick P. Weidner Jr.
Attorney

United States Patent Office 3,524,088
Patented Aug. 11, 1970

3,524,088
DRIVE MECHANISM FOR SELECTIVE OUTPUT MOTIONS
William D. Ryckman, Jr., Asheboro, N.C., assignor to General Electric Company, a corporation of New York
Filed May 19, 1969, Ser. No. 825,534
Int. Cl. H02k 7/14
U.S. Cl. 310—50    11 Claims

ABSTRACT OF THE DISCLOSURE

A drive mechanism to provide at least two different selective output motions for power units, such as an electric toothbrush, that includes a rotatable cam with multiple cam regions and a cam follower that engages different cam regions to provide different motions and means for shifting the cam and cam follower relative to each other to select the desired output motion.

BACKGROUND OF THE INVENTION

This invention relates to a drive mechanism for providing at least two different selected output motions and particularly for a mechanism to be used in an electric toothbrush to impart to an attached brush a plurality of selectively different brush motions.

Electric toothbrushes for use in the home generally include a hand held power unit with several detachable individual toothbrush attachments. Electric toothbrushes may have a cord for plugging into an electrical outlet or for ease of use they may be battery operated. When not in use, the power unit and the individual toothbrush attachments are stored in a stand. In the case of battery operated electric toothbrushes with rechargeable batteries, the stand incorporates a unit for charging the battery.

Prior art electric toothbrushes have a variety of different types of motion imparted to the brush. In one type, the brush attachment is driven by the power unit in a reciprocating or back-and-forth motion. In another type, the brush attachment is driven in an oscillating or up and down motion. Other types of brush motion include, for example, combined reciprocation and oscillation, orbital and rotary. Since each individual user of the toothbrush may desire one type of motion over another, it is highly desirable to provide a mechanism for a toothbrush wherein the user may select between several motions the particular desired brush motion. Some prior art electric toothbrushes have mechanisms that provide selective output motion of the brush, however, their mechanisms are quite complex.

SUMMARY OF THE INVENTION

In accordance with this invention, there is provided a drive mechanism within a housing that imparts at least two different selected periodic motions to a single output shaft. The drive mechanism includes rotary power means driven by a small DC reversible motor having an armature and motor shaft. The motor is reversed by changing its polarity which may be accomplished by any polarity reversing switch commonly used with reversible type motors for controlling their operation. The drive mechanism also includes an elongated rotatable cam having at least three cam regions. Engaging the cam is a cam follower having two sets of cam follower elements that follow the surfaces of two of the cam regions. The cam follower is connected to the output shaft and that shaft is suitably guided to permit the desired selected output motion. Means for shifting relatively the cam and the cam follower is also provided. Upon rotating the cam, the various cam regions in contact with the cam follower elements impart different motions to the output shaft.

It is an object of this invention to provide a drive mechanism that provides at least two different selective output motions from a rotary drive source.

It is another object of this invention to provide a drive mechanism that affords at least two different output motions from a rotary drive source by shifting relatively a cam and cam follower to select the desired output motion.

It is another object of this invention to provide a simple, efficient and reliable drive mechanism for an electric toothbrush by which the user may select the desired brush motion.

BRIEF DESCRIPTION OF THE DRAWINGS

FIG. 1 is a partial sectional cutaway view of an electric toothbrush embodying my invention;
FIG. 2 is a partial sectional cutaway view of the toothbrush of FIG. 1 taken along line 2—2;
FIG. 3 is a sectional end view of the toothbrush taken along line 3—3 of FIG. 2;
FIG. 4 is an exploded view of the drive mechanism components;
FIG. 5 is a diagrammatic view of the cam and cam follower showing their positions relative to each other during oscillating motion;
FIG. 6 is the same as FIG. 5 showing the opposite extreme position of the cam and cam follower during oscillating motion;
FIG. 7 is a diagrammatic view of the cam and cam follower taken along line 7—7 of FIG. 5;
FIG. 8 is a diagrammatic view of the cam and cam follower in their positions relative to each other during reciprocating motion;
FIG. 9 is the same as FIG. 8 showing the opposite extreme position of the cam and cam follower during reciprocating motion;
FIG. 10 is a diagrammatic view of the cam and cam follower taken along line 10—10 of FIG. 8.

DESCRIPTION OF THE PREFERRED EMBODIMENT

With particular reference to the drawings, there is illustrated in FIG. 1 an electric toothbrush incorporating my invention with an electric power unit generally designated at 10. The electric toothbrush is constructed so that it may be held by the user and readily manipulated to enable the user to brush the teeth. Output shaft 11 has at its external end 12 a portion adapted to receive and retain a brush attachment (not shown). The external end portion 12 and the brush attachment have a suitable coupling arrangement so that during the selected motion the brush attachment is retained in its proper operating position. The power unit 10 comprises a generally cylindrically shaped casing or housing 13 which is divided into two halves for convenient manufacturing assembly. The housing 13 is preferably formed of an electrically insulating plastic material which is relatively strong and light weight. The rear or power half 14 contains a suitable rechargeable battery 15, which is shown schematically in FIG. 1 and which is adapted to energize a low voltage direct current reversible motor 20 also contained in the power half 14 of the housing. The reversible motor drives the mechanism of my invention as will be described more fully later. At the base or extreme rear of the power unit 10 is a recharging component 16 that is accepted in a stand (not shown) for charging the battery 15. Suitable means are arranged within the power half 14 of the housing to maintain the battery, motor, and recharging component in their proper positions after assembly. The front half 21 of the housing 13 contains the drive mechanism for the toothbrush which will be described in detail later. After assembly of the various components in each of the two housing halves 14 and 21 the two halves are joined at circumferential joint 22 as by ultrasonic welding. Energization of the reversible motor 20 may be controlled by a switch assembly 23, accessible from outside the housing for manual operation.

With particular reference to FIG. 1, the reversible motor 20 has an armature and a motor shaft 24 which may be rotated in either direction depending upon the energization of the electric motor 20. I have found that a DC permanent magnet motor with a rotatable armature energized by a rechargeable nickel-cadmium battery performs quite satisfactorily. The motor 20 is electrically connected by contacts 25 to the switch assembly 23. The switch assembly may be any polarity reversing switch with an off position commonly used for controlling reversible motors. By manually rotating operating button 37 about the axis of stem 36 the necessary electrical connections are made within the switch assembly to energize the motor and rotate the armature and attached motor shaft in one direction or the other. Attached to the motor shaft 24 is a pinion gear 38. With the motor 20 secured in place within the housing the motor shaft 24 and attached pinion gear 38 are rotated substantially coincidental with the longitudinal axis of the power unit 10 in either a clockwise or counter clockwise direction, depending upon the energization of the reversible motor as described above.

The drive mechanism contained within the forward half 21 of the housing 13 for converting the rotary motion of the motor shaft 24 to selected output motion of the output shaft 11 will now be described with particular reference to FIGS. 1–4. The two periodic output motions of the preferred embodiment to be described will be rotationally oscillating motion and longitudinally reciprocating motion of the output shaft, referred to herein as oscillating motion and reciprocating motion, respectively. The drive mechanism includes an output shaft 11 which has at the end opposite the external brush holding portion 12 a cam follower generally indicated at 39. The cam follower is adapted to encompass and follow a cam 40 that has three different cam regions. Integrally attached to the base of cam 40 is a screw 45. The screw 45 threadingly engages a complementary threaded opening 51 in the hub 44 of face gear 46. The periphery of the circular face gear carries gear teeth 43 projecting outwardly from surface 71 of the face gear that engage and mesh with the pinion gear teeth 42. Pinion gear 38 has a guide shoulder 41 that abuts the outer edge 55 of the face gear 46 to aid in registering the pinion gear and the face gear properly. The face gear 46 and the cam 40 are retained in their proper position within the housing 13 by a steel pin 47 that is secured in a fixed position to opposite sides of the housing substantially at a right angle to the longitudinal axis of the power unit 10. The pin 47 passes through the center of the cam 40, the screw 45, and the hub 44 of the face gear 46 and these drive mechanism components rotate about the pin.

The output shaft 11, including external shaft portion 12, and the cam follower 39 are integrally and rigidly attached to each other. They may be molded from suitable plastic material in one piece. The output shaft 11 is retained in its axial position within the drive mechanism half 21 of the housing 13 by a journal assembly 48 which is designed to accommodate the tapered shape of the front end of the housing. The journal assembly consists of a forward retainer collar 49 and a larger rear retainer collar 50 each of which frictionally grip the ends of a connecting hollow cylindrically shaped sleeve 61 interposed between the collars 49 and 50. Both collars 49 and 50 have central bores 52 and 53, respectively, which cooperate with the hollow sleeve 61 to permit the output shaft 11 to pass through the journal assembly 48. The journal assembly 48 retains ball bearings 62 which are positioned around the central bores 52 and 53 with the bearings maintained in their proper positions by individual cages 54 formed between the collars and sleeve. The ball bearings 62 ride against the smooth cylindrical outer surface of the output shaft 11 when the output shaft is in the journal assembly and ready for either oscillating or reciprocating motion. Any number of ball bearings may be used that will adequately provide support of the output shaft under normal loading conditions during operation of the toothbrush. I have found that five ball bearings distributed around each of the collars works quite satisfactorily. By this journal assembly, the output shaft 11 is maintained in a position substantially coincidental with the longitudinal axis of the power unit 10 and is permitted to move about its longitudinal axis in an oscillating motion and also to move axially in a reciprocating motion.

It is to be noted that the housing 13 should be sealed against water leaking into it, otherwise water could ultimately detrimentally affect the power unit. It is for this purpose that the forward end of the drive mechanism half of the housing has secured to it a flexible elastomeric boot 63 secured to the housing in a waterproof manner and to the output shaft by an O-ring 64. The switch stem 36 opening 56 is also sealed by an O-ring 57 and, as noted previously, the two housing halves are joined together by ultrasonic welding.

The cam follower 39 attached to the output shaft 11 is generally circular in shape in plan view and is provided with two sets of cam following elements. Each set has the cam following elements diametrically spaced from and inwardly directed toward each other. The reciprocating set of cam following elements 65, that is, the set used for imparting reciprocating motion to the output shaft has the cam following elements 65 in alignment with the longitudinal axis of output shaft 11. The oscillating set of cam following elements 70 used for imparting oscillating motion to the output shaft 11 are in a plane parallel to but spaced from the plane in which the reciprocating set of cam following elements lie. Each set of cam following elements are disposed at a right angle to the other. That is, a plan view of the cam follower would show that a line drawn connecting the centers of the two cam following elements of the oscillating set will be at a right angle to a line drawn connecting the centers of the two cam following elements of the reciprocating set but the two lines will be spaced from each other where they cross. The manner in which these sets of cam following elements cooperate with the cam 40 to impart different motions to the output shaft 11 will be described later.

The cam 40 is an axially elongated cam having at least three cam regions. In the particular output motions of the preferred embodiment of my invention wherein reciprocating and oscillating motion is obtained, two of the cam regions are eccentric and one cam region interposed between the two eccentric cam regions is concentric. The cam regions are contiguous and although functioning as separate cams, they are joined together smoothly. Attached to the base 74 of the cam 40 is a screw 45 and normally the cam 40 and screw 45 are molded as one piece from suitable plastic material. The screw 45 threadedly engages an opening 51 in the hub 44 of the face gear 46 and may be moved, within limits, into and out of the hub 44. Below the threaded opening 51 the hub 44 has a cavity 75 with a slightly larger inside diameter than the outside diameter of the screw, thereby providing a shoulder 76 between the cavity 75 and threaded opening 51. Secured to the bottom of the screw 45 is a stop element 77 which prevents the screw from continuing to move out of the hub 44 when the stop element 77 abuts the cavity shoulder 76 as shown in FIG. 2.

When the screw 45 is moved into the hub 44 of the face gear 46, it reaches its limit of travel in this direction when the base 74 of the cam 40 abuts the surface 71 of the face gear 46. As an aid in stopping the screw and cam during this direction of travel and also improve its subsequent ease of release upon reverse rotation of the face gear, there may be provided a stop means consisting of a small stud 78 affixed to the base 74 of the cam 40 and a curved groove 79 in the surface 71 of the face gear 46. One end of the curved groove 79 has a shoulder 81 against which the stud 78 abuts thereby preventing the cam 40 and attached screw 45 from moving any further into the hub 44 of the face gear 46. The groove 79 is curved and of greater depth at the shoulder 81 end than at the opposite end to accommodate the downward rotational sweeping movement of the stud 78 as the screw moves into the hub 44 carrying the cam. In the preferred embodiment of the drive mechanism, two such grooves are used as the screw 45 has a double lead thread and two grooves eliminates any problem of proper orientation during assembly. If desired, this same type of stud and curved groove arrangement may also be incorporated into stop element 77 and cavity shoulder 76 to stop the outward direction of travel of the screw and cam.

The assembly of the drive mechanism is such that the cam follower encompasses the cam 40 with the cam 40 movable axially on pin 47. Pin 47, as previously discussed, is substantially at a right angle to the longitudinal axis of the power unit 10. The pin is also at a right angle to the axis of the output shaft 11 to which the cam follower is attached. By rotating the face gear 46, the screw is moved into and out of the hub 44, depending upon the direction of rotation of the face gear and cam 40 is carried with it. With this arrangement then, cam 40 is moved on the pin 47 along its axis and the various cam regions of the cam 40 are positioned with respect to the two sets of cam follower elements of the encompassing cam follower.

With reference particularly to FIGS. 5, 6 and 7, the manner in which the cam 40 and cam follower 39 cooperate to produce oscillating motion about the longitudinal axis of the output shaft 11 will be discussed. The oscillating set of cam elements 70 engage the upper cam region 72 of cam 40 with both cam following faces $a$ and $a'$ of the cam follower elements riding on cam region 72. Cam region 72 is eccentric relative to its axis of rotation which is pin 47. FIGS. 5 and 6 represent the two extreme points of oscillating motion of the cam follower as determined by the rotation of eccentric cam region 72. With the oscillating set of cam following elements 70 being in a plane above the longitudinal axis of the output shaft 11 about which the output shaft oscillates, the camming action applied to the cam follower as the oscillating set of cam following elements 70 follow eccentric cam region 72 during its rotation imparts a rocking or oscillating motion to the output shaft 11. The desired degree of oscillation can, of course, be changed by varying the dimensions of the eccentric cam region 72 and cam follower 39. The top 82 of the cam 40 is slanted downwarly from its axis of rotation in the direction of the major portion of the eccentric cam region 72 so that during rotation of cam region 72, the faces $a$ and $a'$ of the oscillating set of cam following elements 70 are in continuous contact with the cam surface as specifically shown in the two extreme positions of the cam and cam follower in FIGS. 5 and 6.

FIG. 7, taken along line 7—7 of FIG. 5, shows the corresponding position of the reciprocating set of cam following elements 65. The reciprocating set of cam following elements 65 have cam riding faces $b$ and $b'$ which are in contact with concentric cam region 73 at the same time as the oscillating set of cam elements 70 are following eccentric cam region 72 during rotation of cam 40. Since the cam region 73 is concentric, rotation of that cam region does not apply any camming action to the cam follower elements 65, therefore, the only movement the cam follower imparts to the attached output shaft 11 is that produced by the cooperation between the oscillating set of cam following elements 70 and the eccentric cam region 72.

The position of cam 40 relative to encompassing cam follower 39 to orient the oscillating set of cam elements 70 with respect to cam region 72 is accomplished when base 74 of cam 40 is near face gear 46 and the stud 78 is urged against shoulder 81 at the end of groove 79 to stop the screw from further movement into the hub 44. This is achieved by rotating the motor shaft 24 and attached pinion gear 38 counterclockwise, as viewed from the rear of the motor, whereupon face gear 46 is rotated about its axis to cause the screw 45 engaging threaded opening 51 to move into the hub 44 carrying with it cam 40 until stud 78 abuts shoulder 81. Thereafter, as the face gear continues to rotate in this same direction, the cam 40 and face gear 46 will rotate in unison about their axes on pin 47.

To obtain reciprocating motion of the output shaft 11 the pinion gear 38 is rotated in a clockwise motion by reversing the motor 20, thereby causing the face gear 46 to rotate in the opposite direction. Upon rotation of the face gear 46 with the threaded opening 51 engaging the screw 45 in this direction, the screw 45 is moved outwardly from the hub 44 carrying with it the cam 40 until stop element 77, attached to the end of the screw 45, abuts cavity shoulder 76, as shown particularly in FIGS. 2, 8 and 9. When this outwardly most position is reached, the cam 40 and face gear 46 will rotate in unison about their axes on pin 47. FIGS. 8, 9 and 10 show the position of the cam 40 relative to the cam follower 39 in position to produce reciprocating motion to the output shaft 11. As shown in FIG. 8, the set of reciprocating cam elements 65 contact eccentric cam region 80 with cam element faces $b$ and $b'$ riding on the cylindrical cam surface of cam region 80. Upon rotation about pin 47 of cam 40 and therewith eccentric cam region 80, the cam follower and attached output shaft 11 are moved in a reciprocating motion along the longitudinal axis of the output shaft. FIGS. 8 and 9 show the two extreme positions of the cam region 80 and cam follower 39 during reciprocating motion. With this arrangement, as cam 40 is rotated eccentric cam region 80 forces the cam follower 39 and the reciprocating set of cam following elements 65, which are substantially in alignment with the longitudinal axis of the output shaft 11, to reciprocate in line with said axis. FIG. 10 taken on line 10—10 of FIG. 8 shows the position of the oscillating set of cam following elements 70 relative to the cam 40 during reciprocating motion of the output shaft 11. The faces $a$ and $a'$ of these cam elements are now riding on the surface of concentric cam region 73, therefore, the motion the cam follower imparts to the attached output shaft is solely influenced by the cooperative operation of the reciprocating set of cam following elements 65 and eccentric cam region 80.

It should be noted that the three separate contiguous cylindrical cam regions 72, 73 and 80 should be equal in diameter and it is desirable to have the cam surfaces joining the cam regions smoothly blended. The faces $a$ and $a'$ of the oscillating set 70 of cam following elements should be spaced the same distance apart as the faces $b$ and $b'$ of the reciprocating set of cam following elements 65 and this distance should be approximately the same as the diameter of the cam regions. In this manner during shifting of the cam 40 relative to the cam follower 39, as discussed above, the cam 40 is easily movable and guided between the cam following elements within the cam follower 39. Moreover, if the cam 40 and cam follower 39 are made from materials that have good lubricity characteristics, the ease of shifting the cam relative to the cam follower, as well as subsequent operation of the cam and cam follower, is enhanced. The respective surfaces may, of course, also be lubricated as an aid.

The manner in which my electric toothbrush operates with the above described drive mechanism to provide either oscillating or reciprocating output motion from a rotary drive source is as follows. The user selects the desired brush motion by manually rotating the button 37 of switch assembly 23 to the motion desired as indicated by appropriate indicia underlying the button 37. Assuming that the user wishes to have oscillating motion and turns the button 37 accordingly, the switch energizes the reversible motor so that the armature rotates counterclockwise. Since the armature, motor shaft 24, and pinion gear 38 are connected, the pinion gear is also rotated counterclockwise, as viewed from the rear of the motor. Pinion gear 38 meshes with the teeth 43 of face gear 46 at a right angle to cause the face gear to rotate about its axis on pin 47. Upon rotation of the face gear threaded opening 51 in the hub of the face gear in threaded engagement with the screw 45 causes the screw to be drawn or moved into the hub of the face gear until the base 74 of the cam 40 is near the upper surface 71 of the face gear 46 and stud 78 hits shoulder 81 in the end of groove 79, thus preventing any further movement of the screw into the hub 44. Thereafter cam 40 and face gear 46 will rotate in unison as rotation in this direction continues. The oscillating set of cam elements 70 and their faces a–a' are now in contact with the cam surface of eccentric cam region 72, and the reciprocating set of cam elements 65 and their faces b–b' are in contact with concentric cam region 73. Face gear 46 and cam 40 continue to rotate about pin 47 in unison, and the oscillating set of cam following elements 70 follow eccentric cam region 72. With the oscillating set of cam following elements 70 rigidly secured to the cam follower 39 which in turn is attached to the output shaft 11 journaled to permit oscillating motion about its longitudinal axis, the output shaft 11 and any brush attached thereto has oscillating motion imparted to it. With the reciprocating set of cam following elements 65 and their faces b–b' riding on concentric cam region 73, that set of cam following elements does not influence the motion imparted to the output shaft 11 by the cam follower. When the user desires to change from oscillating motion to reciprocating motion, he manually operates the button 37 of the switch 23 to the reciprocating position, thereby reversing the polarity of the motor which reverses the direction of rotation of the motor shaft 24 and the pinion gear 38. The pinion gear 38 now rotates clockwise and drives face gear 46 in a reverse direction of rotation about its axis on pin 47. With the direction of rotation of the face gear 46 reversed, the threaded opening 51 threadedly engaging screw 45 causes the screw 45 to now move outwardly from the hub 44 carrying with it the cam 40 until stop element 77 abuts shoulder 76 of cavity 75. By so shifting the position of cam 40 with respect to the cam follower 39, different cam regions of the cam 40 are presented to the respective sets of cam following elements 65 and 70. In this case, the faces b–b' of reciprocating set of cam following elements 65 are in riding contact with eccentric cam region 80, and the faces a–a' of the oscillating set of cam following elements 70 are in riding contact with concentric cam region 73. With face gear 46 continuing to rotate, cam 40 is rotated in unison therewith, and cam follower 39 with attached output shaft 11 are both moved in a reciprocating motion along the longitudinal axis of the output shaft 11. By the drive mechanism of my invention, an electric toothbrush of the preferred embodiment allows the user to select between oscillating and reciprocating motion the particular brush motion desired and he may make the selection by merely changing the direction of rotation of a reversible electric motor.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications that fall within the true spirit and scope of the present invention.

I claim:

1. A drive mechanism to provide at least two different periodic output motions from a rotary drive source comprising:
   (a) drive means to rotate a cam, said cam having at least three cam regions;
   (b) a cam follower cooperative with said cam and having two sets of spaced cam follower elements in engagement with two of said cam regions;
   (c) output means guided for motion connected to said cam follower; and
   (d) means for shifting relatively said cam and cam follower to select said output motion.

2. The drive mechanism in accordance with claim 1 wherein at least one of said cam regions is concentric.

3. The drive mechanism of claim 1 in which said cam follower surfaces are in constant contact with said cam.

4. The drive mechanism of claim 1 wherein one set of cam follower elements controls reciprocating motion and one set of cam follower elements controls oscillating motion.

5. The drive mechanism of claim 2 wherein the concentric cam region is between two other cam regions, and one set of cam follower elements engages the concentric cam region surface while the other set of cam follower elements engages one of the other cam regions.

6. A mechanism within a housing for a power unit to provide at least two different periodic output motions comprising:
   (a) a reversible electric motor with a rotatable motor shaft;
   (b) an axially elongated cam having at least three cam regions laterally along the cam;
   (c) means in driven connection with said motor for rotating said cam;
   (d) a cam follower cooperative with said cam and having two sets of spaced cam follower elements in engagement with two of said cam regions;
   (e) output means guided for motion with respect to said housing connected to said cam follower; and
   (f) means for shifting relatively said cam and cam follower to select said output motion in response to the direction of rotation of the motor shaft.

7. The mechanism of claim 6 wherein one set of cam follower elements controls reciprocating motion and one set of cam follower elements controls oscillating motion.

8. The mechanism of claim 6 wherein one cam region is concentric and between two other cam regions, and one set of cam follower elements engages the concentric cam region surface, while the other set of cam follower elements engages one of said two other cam regions.

9. The mechanism of claim 6 wherein the means for shifting relatively said cam and cam follower is a screw that carries the cam and changes the position of the cam relative to the cam follower in response to a change in direction of rotation of the motor shaft.

10. In a power unit for a battery operated electric toothbrush the combination of:
   (a) a housing;
   (b) battery operated reversible motor having a rotatable armature and motor shaft selectively rotatable in either direction;
   (c) a battery for energizing the motor;
   (d) an output shaft guided for both reciprocating motion along its longitudinal axis and oscillating motion about said axis;
   (e) switch means for selectively controlling the direction of rotation of the armature and motor shaft;
   (f) drive means connecting said motor shaft and output shaft, said drive means comprising:
      (aa) an axially elongated cam having at least three cam regions laterally along the cam with one cam region being concentric;

(bb) means in driven connection with said motor shaft for rotating said cam;
(cc) a cam follower cooperative with said cam and having two sets of spaced cam follower elements in engagement with two of said cam regions; and
(dd) means for shifting said cam relative to the cam follower to select said output motion in response to the direction of rotation of the motor shaft.

11. The power unit of claim 10 wherein the means for shifting relatively said cam and cam follower is a screw that carries the cam and changes the position of the cam relative to the cam follower in response to a change in direction of rotation of the motor shaft.

References Cited
UNITED STATES PATENTS

| | | | |
|---|---|---|---|
| 2,788,677 | 4/1957 | Hayek | 74—569 |
| 3,160,744 | 12/1964 | Weiss | 235—197 |
| 3,160,902 | 12/1964 | Aymar | 15—22 |
| 3,238,797 | 3/1966 | Coughren | 74—567 X |
| 3,300,664 | 1/1967 | Boyles | 310—80 X |
| 3,379,906 | 4/1968 | Spohr | 310—50 |

DONOVAN F. DUGGAN, Primary Examiner

U.S. Cl. X.R.

15—22; 74—55, 569; 310—80